(12) United States Patent
Hsu et al.

(10) Patent No.: US 7,976,741 B2
(45) Date of Patent: Jul. 12, 2011

(54) METHOD OF MANUFACTURING LIGHT GUIDE PLATE OF KEYPAD

(75) Inventors: Chih-Ho Hsu, Taoyuan (TW); Jian-Li Chang, Taoyuan (TW)

(73) Assignee: Ichia Technologies, Inc., Taoyuan (TW)

( * ) Notice: Subject to any disclaimer, the term of this patent is extended or adjusted under 35 U.S.C. 154(b) by 1005 days.

(21) Appl. No.: 11/673,646

(22) Filed: Feb. 12, 2007

(65) Prior Publication Data
US 2008/0193676 A1 Aug. 14, 2008

(51) Int. Cl.
*B29D 7/00* (2006.01)
*B29D 7/01* (2006.01)
*B29D 11/00* (2006.01)
*B05D 1/28* (2006.01)

(52) U.S. Cl. ...... 264/1.34; 264/1.25; 264/241; 362/606; 156/379.6; 156/275.5

(58) Field of Classification Search .......... 264/239–241, 264/1.24, 1.34, 1.25; 362/606; 156/231, 156/238
See application file for complete search history.

(56) References Cited

U.S. PATENT DOCUMENTS

| | | | | |
|---|---|---|---|---|
| 4,141,313 | A * | 2/1979 | Hefele | 118/212 |
| 6,120,636 | A * | 9/2000 | Nilsen et al. | 156/230 |
| 6,272,275 | B1 * | 8/2001 | Cortright et al. | 385/129 |
| 6,325,880 | B1 * | 12/2001 | Yamashita et al. | 156/209 |
| 7,429,709 | B2 * | 9/2008 | Kim | 200/310 |
| 7,455,416 | B2 * | 11/2008 | Chen | 362/85 |
| 7,804,649 | B2 * | 9/2010 | Eckhardt et al. | 359/619 |
| 7,931,841 | B2 * | 4/2011 | Huizinga et al. | 264/173.1 |
| 2005/0064142 | A1 * | 3/2005 | Matsunaga et al. | 428/141 |
| 2006/0062969 | A1 * | 3/2006 | Honda | 428/172 |
| 2006/0108062 | A1 * | 5/2006 | Smith et al. | 156/272.2 |
| 2006/0118426 | A1 | 6/2006 | Choi | |
| 2006/0120110 | A1 | 6/2006 | Lin et al. | |
| 2006/0177607 | A1 * | 8/2006 | Ohmori et al. | 428/1.31 |
| 2006/0254894 | A1 | 11/2006 | Jung et al. | |
| 2006/0262310 | A1 * | 11/2006 | Starry et al. | 356/429 |
| 2007/0064294 | A1 * | 3/2007 | Hoshino et al. | 359/237 |
| 2007/0091588 | A1 * | 4/2007 | Hwang | 362/97 |
| 2007/0109792 | A1 * | 5/2007 | Chosa et al. | 362/341 |
| 2007/0247828 | A1 * | 10/2007 | Kim | 362/24 |
| 2008/0013014 | A1 * | 1/2008 | Kuo et al. | 349/64 |
| 2008/0089050 | A1 * | 4/2008 | Hsu et al. | 362/26 |
| 2008/0176034 | A1 * | 7/2008 | Pricone | 428/131 |

(Continued)

FOREIGN PATENT DOCUMENTS
WO   WO 2005/131883 A1 * 4/2005

*Primary Examiner* — Joseph S Del Sole
*Assistant Examiner* — Nahida Sultana
(74) *Attorney, Agent, or Firm* — Chun-Ming Shih; HDLS IPR Services (57) ABSTRACT

A method of manufacturing a light guide plate containing a plurality of light-guiding micro structures comprises the steps of: preparing a mold that has a concave hole formed by a plurality of light-guiding micro structures; pouring a mixture of ultraviolet curable resins and glass microbeads into the mold; attaching a carrier onto the mixture; using a rolling tool to roll the surface of the carrier, such that the mold is filled up with the mixture uniformly, while the air among the mold, the carrier and the mixture is discharged; and finally projecting the ultraviolet light onto the ultraviolet curable resin, such that the ultraviolet curable resin can be cured at the carrier and removed from the mold, so as to form a light guide plate having a plurality of light-guiding micro structures.

5 Claims, 11 Drawing Sheets

U.S. PATENT DOCUMENTS

2009/0168000 A1* 7/2009 Miyazaki et al. ............. 349/118
2010/0283942 A1* 11/2010 Murao et al. ................... 349/64
2011/0002142 A1* 1/2011 Yuuki et al. ................... 362/606
2011/0007400 A1* 1/2011 Amano et al. ................ 359/642

* cited by examiner

METHOD OF MANUFACTURING LIGHT GUIDE PLATE OF KEYPAD

BACKGROUND OF THE INVENTION

1. Field of the Invention

The present invention relates to a keypad structure, and more particular to a method of manufacturing a light guide plate.

2. Description of Prior Art

A keypad structure is one of the main input peripherals of an electronic device, and each keypad on the keypad structure generally has a corresponding numeral, text, phonetic symbol, radical of an input method and different functional figures, so that an user can input data, or execute various functions of the electronic device. Therefore, a keypad structure is an important input peripheral for an electronic device.

Since an electronic device is usually operated in an environment with sufficient light, therefore users can see the position of each keypad clearly and will not press a wrong keypad. If the electronic device is operated in a dark environment, users will have difficulties of operating the keypads on the electronic device. Therefore, internal layers of the keypad structure usually include a backlight source, and the light produced by the backlight source allows users to see the position of each keypad clearly in a dark environment, and prevents a user from pressing a wrong keypad.

In general, the backlight source used in a traditional keypad structure is comprised of a light guide plate and a light emitting diode. When an electronic device is turned on, the light emitting diode is lit, and the light is guided into the front end of the light guide plate, and then projected from the light guide plate to the bottom of each keypad to display a hollow numeral or figure at the surface of the keypad, so as to prevent users from pressing a wrong keypad when operating the keypad in a dark environment. However, when the light of the light emitting diode is guided from the front end to the rear end of the light guide plate, the brightness of the light becomes increasingly weak, and thus the brightness for showing the numeral and figure at the surface of the keypad with respect to the rear end of the light guide plate is insufficient.

In recent years, manufacturers add light-guiding micro structures to the light guide plate to solve the problem of the unevenly distributed light, such that when the light is guided into the light guide plate, the light-guiding micro structures can change the light path, and focus the refraction of light onto each keypad. Since a traditional light guide plate having light-guiding micro structures is produced by an ink jet technology, resins injected by an ink jet head is formed directly on a carrier to produce light-guiding micro structures, but the ink jet head must be moved back and forth along the y-axis to spray the resins onto the carrier, and thus the production efficiency becomes very low.

Another manufacturing method is an imprint method that uses a roller for a rolling process, and the surface of the roller has a plurality of protruding light-guiding micro structures, such that if the roller is rolled on a surface or a backside of the soft and firm carrier, the carrier will be deformed, and the carrier will be bounced back towards a same direction. Therefore, it is necessary to adjust the pressing force of the roller according to the bouncing force produced after the material of the carrier is deformed, if the roller is used for the rolling. If the pressing force of the roller is not adjusted precisely, then defects of the light-guiding micro structure will result, and the light cannot be focused and refracted onto the keypad.

SUMMARY OF THE INVENTION

In view of the foregoing shortcomings of the prior art, the inventor of the present invention based on years of experience in the related industry to conduct experiments and modifications, and finally invented a method of manufacturing a light guide plate of a keypad, such that a plurality of light-guiding micro structures can be formed easily on a carrier to improve the production efficiency.

It is a primary objective of the present invention to provide a method of manufacturing a light guide plate of a keypad to overcome the shortcomings of the prior art.

To achieve the foregoing objective, the method of manufacturing a light guide plate of a keypad in accordance with the present invention comprises the following steps:

1. Prepare a mold, and the mold has a mold cavity, and the mold cavity contains a plurality of areas, and each area comprises a plurality of concave holes.
2. Mix an ultraviolet curable resin and a glass microbead to produce a mixture.
3. Pour the mixture into the mold.
4. Attach the carrier on the mixture.
5. Use a rolling tool to roll a surface of the carrier, such that the mold is filled up with the mixture uniformly, while the air among the mold, carrier and mixture is discharged.
6. Project an ultraviolet light on the mixture, such that the mixture is cured at the carrier, and remove the mixture from the mold to form a light guide plate having a plurality of light-guiding micro structures.

BRIEF DESCRIPTION OF DRAWINGS

The features of the invention believed to be novel are set forth with particularity in the appended claims. The invention itself however may be best understood by reference to the following detailed description of the invention, which describes certain exemplary embodiments of the invention, taken in conjunction with the accompanying drawings in which:

DETAILED DESCRIPTION OF THE INVENTION

The technical characteristics, features and advantages of the present invention will become apparent in the following detailed description of the preferred embodiments with reference to the accompanying drawings. The drawings are provided for reference and illustration only, but not intended for limiting the present invention.

Figure 1:
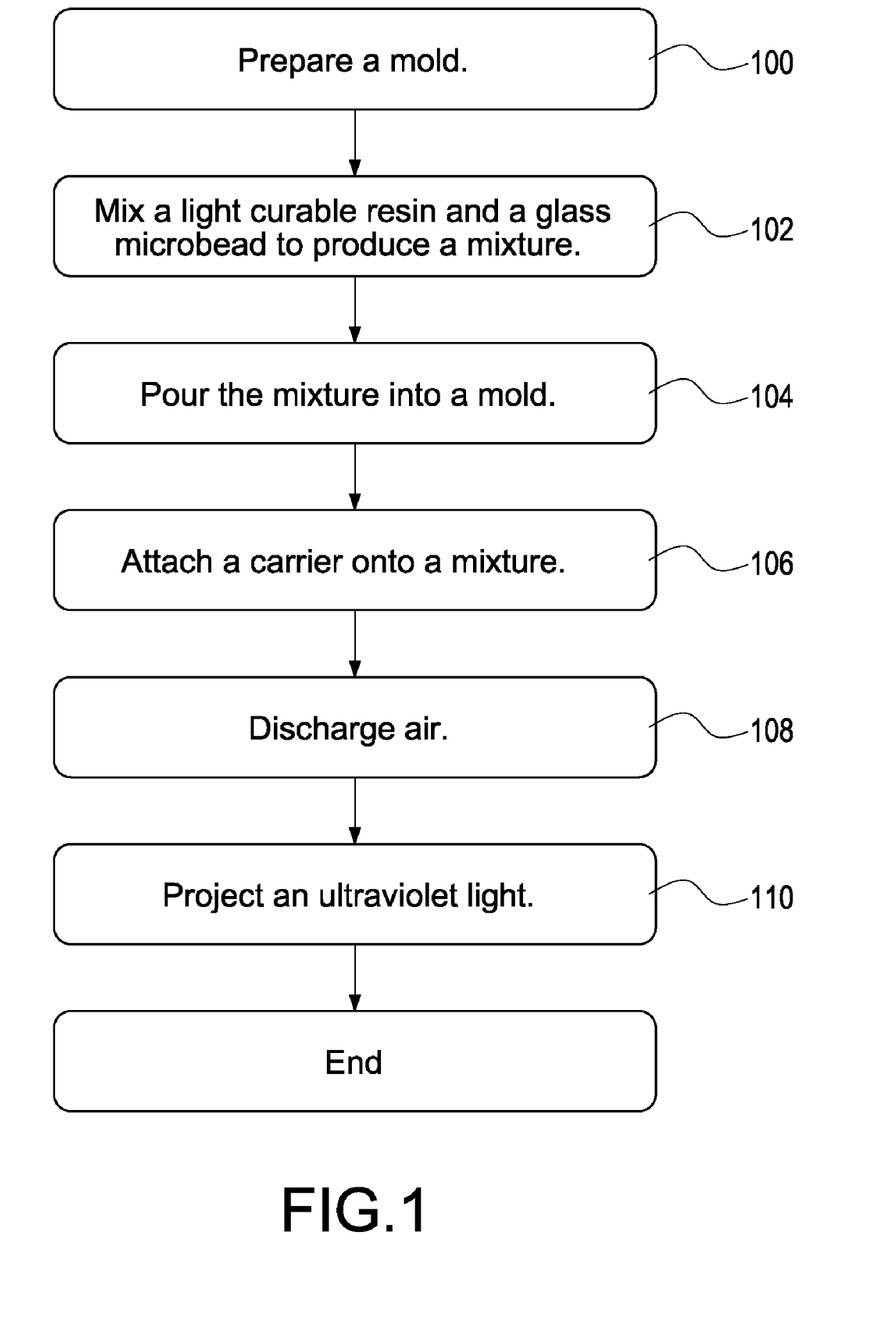
FIG. 1 is a flow chart of manufacturing a light guide plate of the present invention.

Referring to FIG. 1 for a flow chart of manufacturing a light guide plate of the present invention, a method for manufacturing the light guide plate installed in a keypad structure comprises the following steps:

Step 100: Prepare a mold.

Step 102: Mix a light curable resin and a glass microbead to produce a mixture. The light curable resin in FIG. 1 is an ultraviolet curable resin.

Step 104: Pour the mixture into a mold.

Step 106: Attach a carrier onto a mixture. The carrier in FIG. 1 is a transparent color film selected from a PC film or a TPU film.

Step 108: Use a rolling tool to roll a surface of the carrier, such that the mold is filled up with the mixture uniformly, while the air among the mold, carrier and mixture is discharged. The rolling tool in FIG. 1 is a roller.

Step 110: Project an ultraviolet light onto a light curable resin after the light curable resin and carrier are rolled, so that the light curable resin is cured at the carrier, and then remove the resin from the mold to form a light guide plate having a plurality of light-guiding micro structures.

Figure 2:
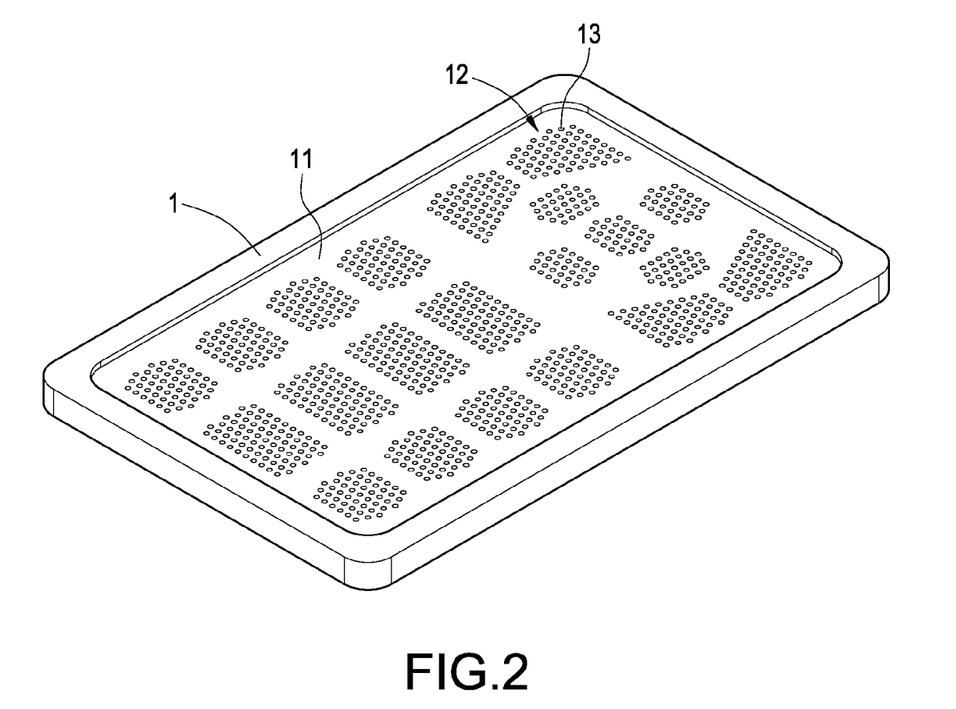
FIG. 2 is a perspective view of a mold used for manufacturing a light guide plate in accordance with the present invention.

Referring to FIG. 2 for a perspective view of a mold used for manufacturing a light guide plate in accordance with the present invention, the mold 1 used for making the light guide plate is a cuboid, and the mold 1 has a mold cavity 11, and the mold cavity 11 contains a plurality of areas 12, and the area 12 comprises a plurality of concave holes 13.

Figure 3:
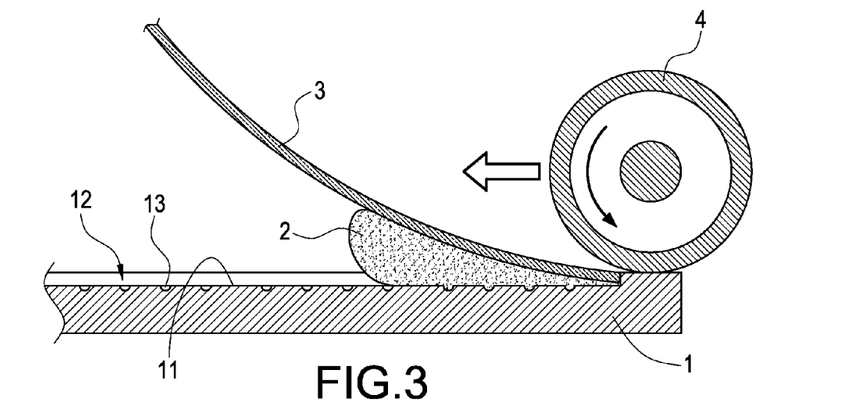
FIG. 3 is a schematic view of manufacturing a light guide plate on a mold before rolling the light guide plate in accordance with the present invention.
Figure 4:
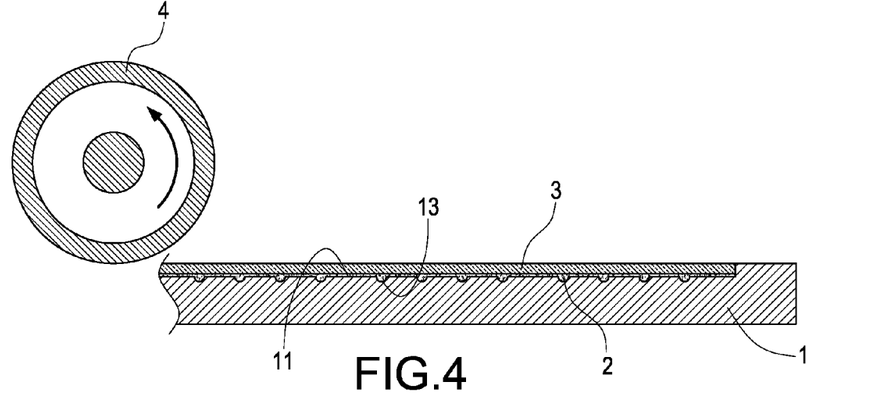
FIG. 4 is a schematic view of manufacturing a light guide plate on a mold after rolling the light guide plate in accordance with the present invention.

Referring to FIGS. 3 and 4 for schematic views of manufacturing a light guide plate on a mold before and after rolling the light guide plate in accordance with the present invention respectively, a mixture 2 of the light curable resin and glass microbead is poured into the mold cavity 11 of the mold 1, and a carrier 3 is placed onto the mixture 2, and a rolling tool 4 is set on a surface of the carrier 3. If the rolling tool 4 is rolled on the surface of the carrier 3, the mixture 2 and the carrier 3 will be engaged, and the mold cavity 11 will be filled up with the mixture 2. In the rolling process of the rolling tool 4, the air between the mixture 2 and the carrier 3 as well as the mixture 2 and the mold 1 will be discharged to prevent the air from being remained on a manufactured light guide plate, which will result in a defective light guide plate.

Figure 5:
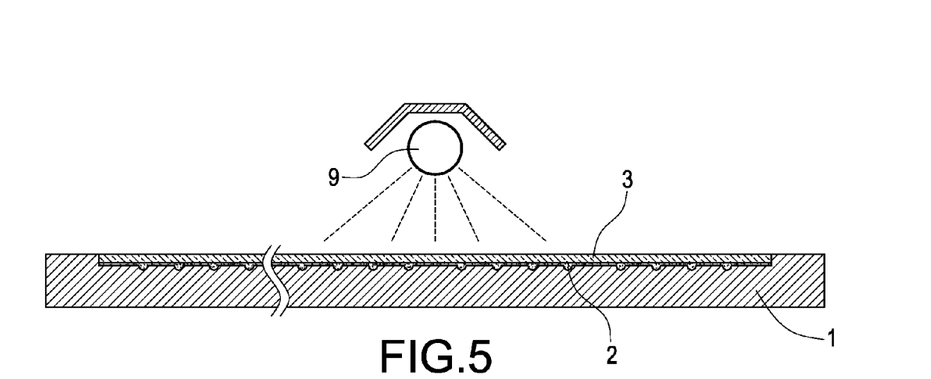
FIG. 5 is a schematic view of projecting light on a light curable resin in accordance with the present invention.

Referring to FIG. 5 for a schematic view of projecting light on a light curable resin in accordance with the present invention, the mold 1 is sent to a light projecting area and projected by an ultraviolet lamp light 9 after the rolling process is completed. After the mold 1 is projected for a period of time, the light curable resin is cured at the carrier 3, such that the carrier 3 and the mixture 2 can be securely engaged with each other.

Figure 6:
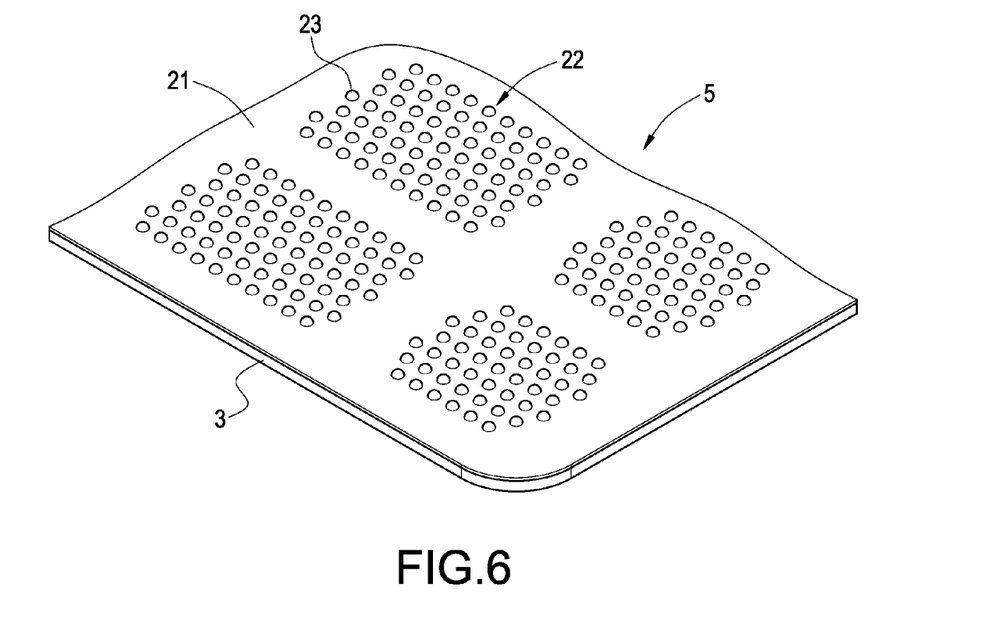
FIG. 6 is a schematic view of a portion of a light guide plate of the present invention.
Figure 7:
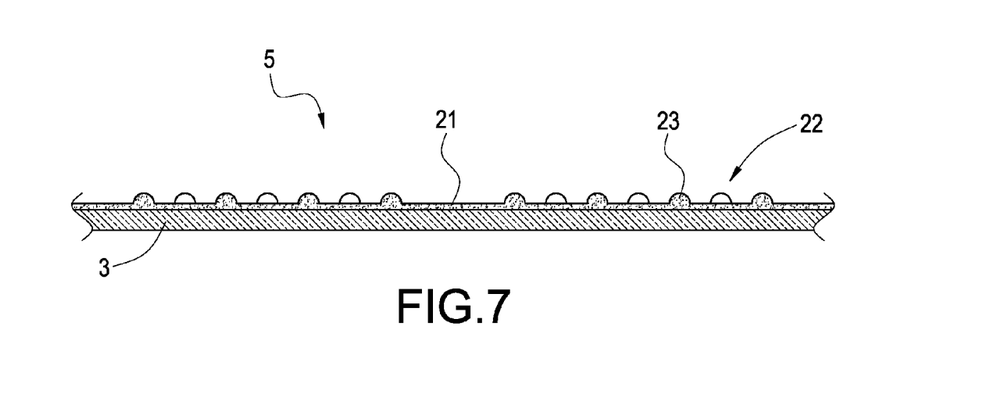
FIG. 7 is a side view of a light guide plate of the present invention.

Referring to FIGS. 6 and 7 for a schematic view and a side view of a light guide plate in accordance with the present invention respectively, the light guide plate 5 has a carrier 3, and the carrier 3 has a laminate 21, and the laminate 21 has a plurality of areas 22, and each area 22 comprises a plurality of light-guiding micro structures 23, after the manufactured light guide plate 5 is removed from the mold 1. The closer the distance of the light-guiding micro structure 23 from a light source, the lower is the density of distribution of the light-guiding micro structures 23; the farther the distance, the higher is the density of distribution of the light-guiding micro structures 23. The light-guiding micro structures 23 change the light path to provide a focusing effect, so that the light is guided towards a keypad on the keypad structure.

Figure 8:
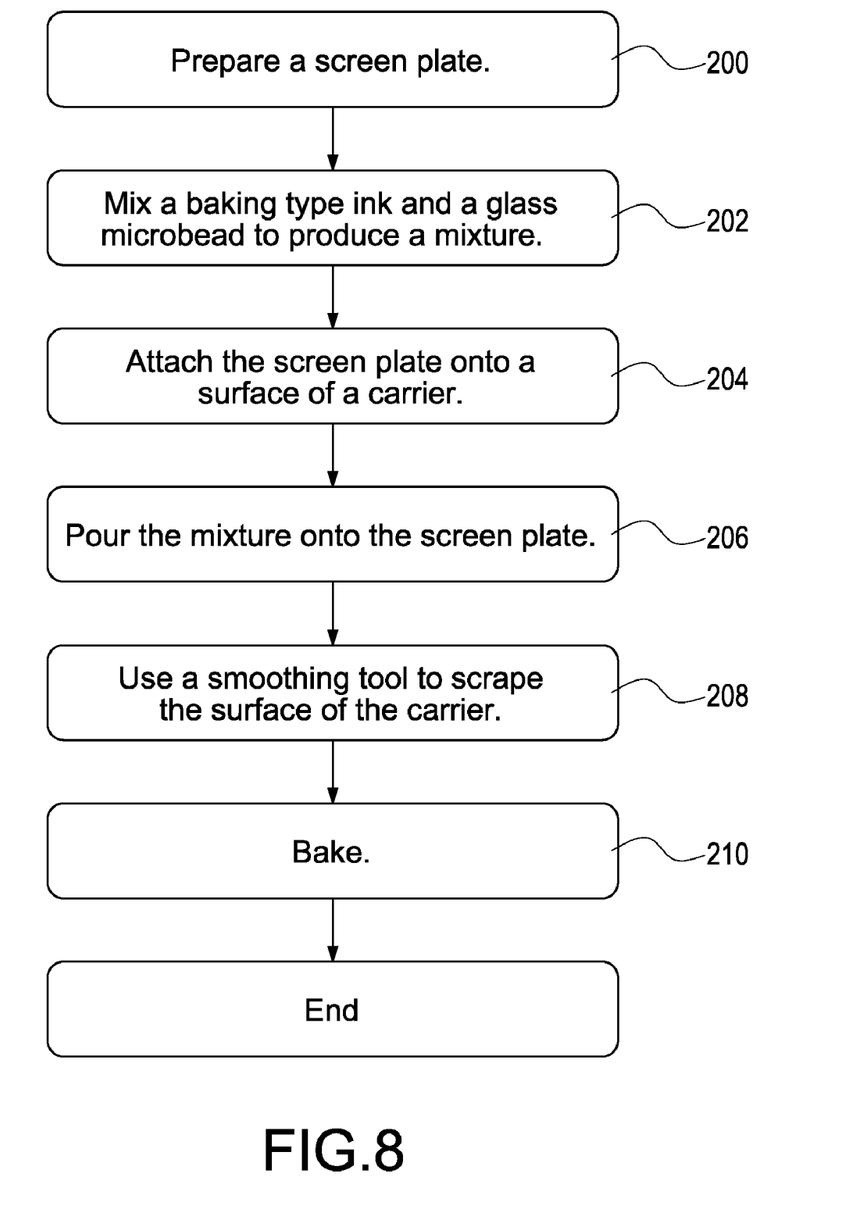
FIG. 8 is a flow chart of manufacturing another type of light guide plate in accordance with the present invention.

Referring to FIG. 8 for a flow chart of manufacturing another type of light guide plate in accordance with the present invention, a method of manufacturing a light guide plate installed in a keypad structure comprises the following steps:

Step 200: Prepare a screen plate.

Step 202: Mix a baking type ink and a glass microbead to produce a mixture. In FIG. 8, the baking type ink comprises polycyclic aromatic hydrocarbon (PAH), cyclohexanone, butoxide, and polymer resin, all with a high boiling point.

Step 204: Attach the screen plate onto a surface of a carrier. In FIG. 8, the carrier is a transparent color film which is either a PC film or a TPU film.

Step 206: Pour the mixture onto the screen plate.

Step 208: Use a smoothing tool to scrape the surface of the carrier, such that the mixture can be permeated into meshes of the screen plate and attached onto the surface of the carrier. In FIG. 8, the smoothing tool is a scraper.

Step 210: Put both screen plate and carrier into an oven for baking, so that the baking type ink is cured at the carrier, and then separate the carrier and screen plate to complete manufacturing a light guide plate.

Figure 9:
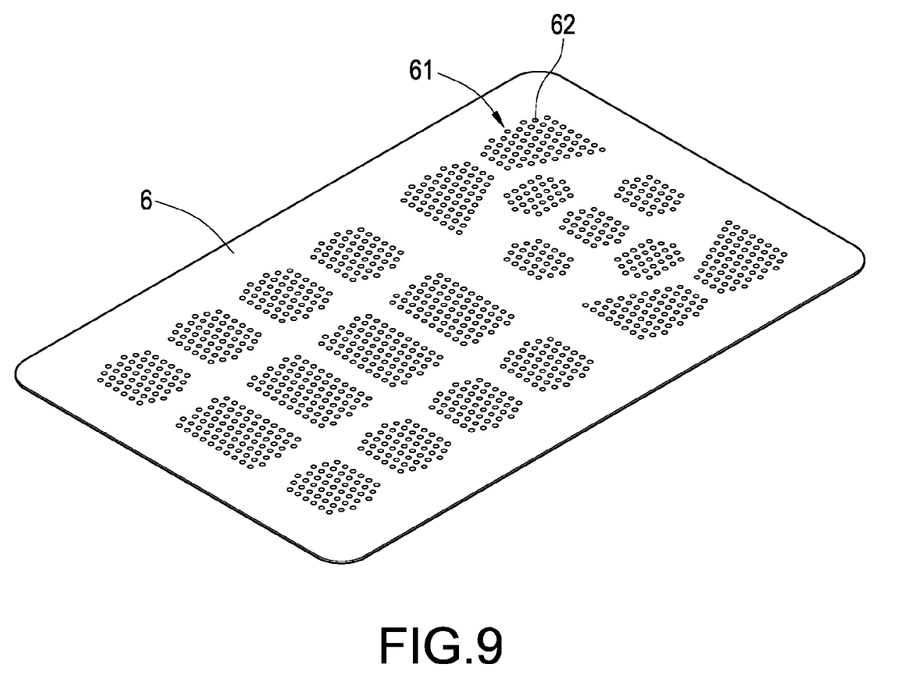
FIG. 9 is a perspective view of a screen plate used for manufacturing a light guide plate in accordance with the present invention.

Referring to FIG. 9 for a perspective view of a screen plate used for manufacturing a light guide plate in accordance with the present invention, the screen plate 6 used for the light guide plate is a cuboid, and the screen plate 6 has a plurality of blocks 61, and each block 61 comprises a plurality of meshes 62.

Figure 10:
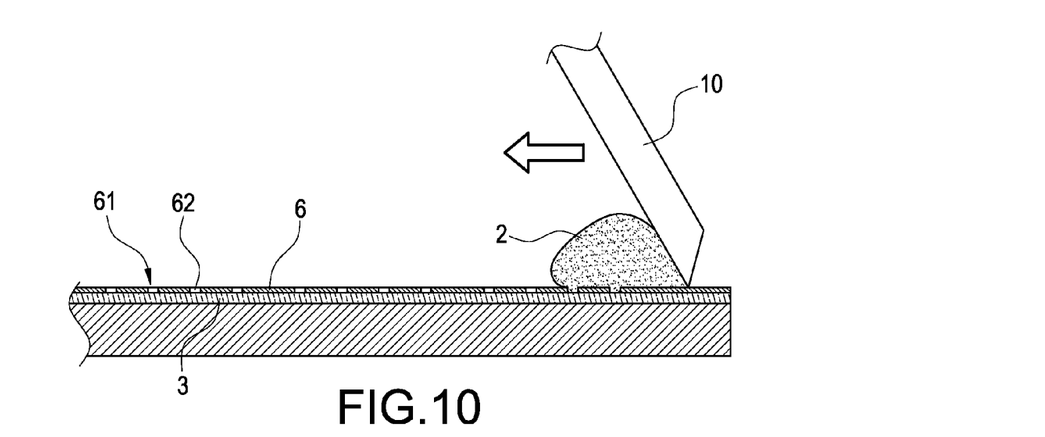
FIG. 10 is a schematic view of manufacturing a light guide plate on a screen plate before smoothing the light guide plate in accordance with the present invention.
Figure 11:
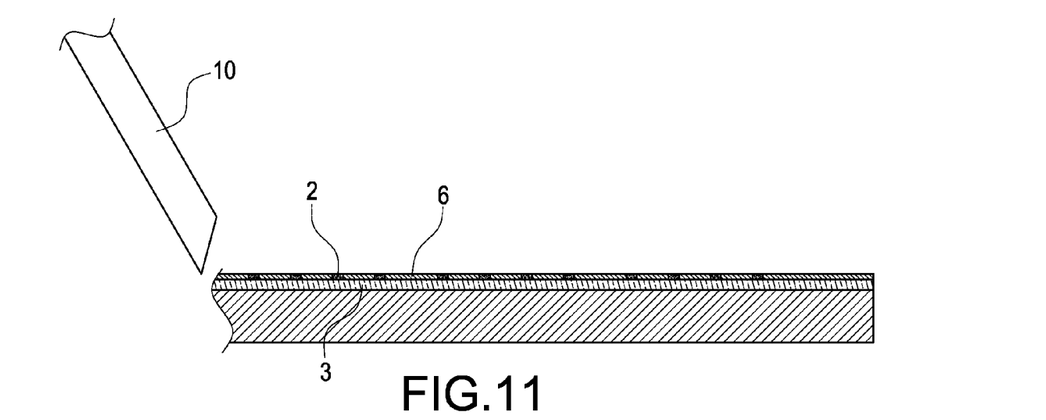
FIG. 11 is a schematic view of manufacturing a light guide plate on a screen plate after smoothing the light guide plate in accordance with the present invention.

Referring to FIGS. 10 and 11 for schematic views of manufacturing a light guide plate on a screen plate before and after smoothing the light guide plate in accordance with the present invention respectively, the carrier 3 is placed on the surface of a platform, and the screen plate 6 is attached onto the surface of the carrier 3, and the mixture 2 is poured onto a surface of the screen plate 6, and a smoothing tool 10 is used to level the mixture 2 on the screen plate 6. By then, the mixture 2 is permeated in to meshes 62 of the screen plate 6 and attached onto the surface of the carrier 3.

Figure 12:
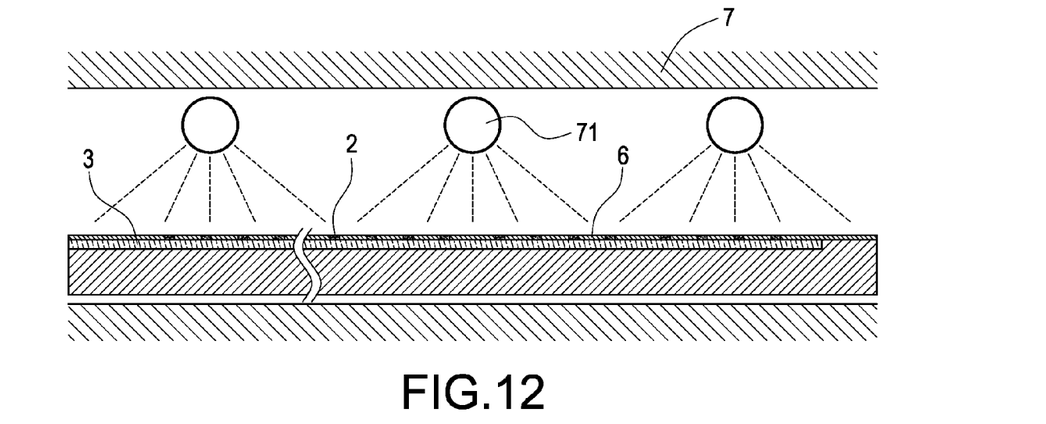
FIG. 12 is a schematic view of projecting light on thermal setting curable resin in accordance with the present invention.

Referring to FIG. 12 for a schematic view of projecting light on thermal setting curable resin in accordance with the present invention, the screen plate 6 and carrier 3 are sent to an oven 7 after the mixture is smoothed, and a heating device 71 of the oven 7 is provided for baking. After the screen plate 6 and carrier 3 are baked for a period of time, the baking type ink is cured at the carrier 3, such that the carrier 3 and the mixture 2 are securely combined with each other.

Figure 13:
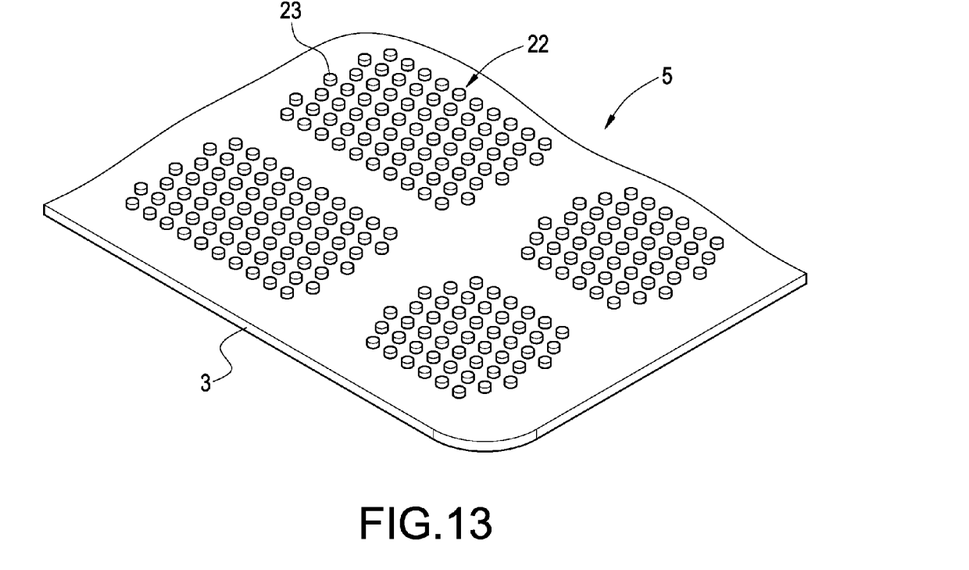
FIG. 13 is a schematic view of a portion of a light guide plate of the present invention.
Figure 14:
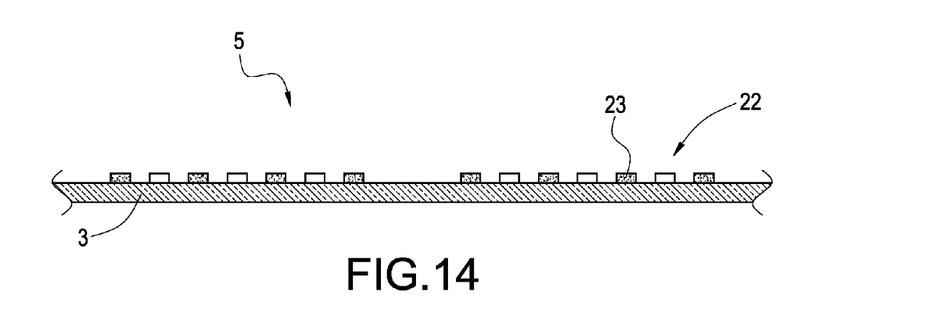
FIG. 14 is a side view of a light guide plate of the present invention.

Referring to FIGS. 13 and 14 for a schematic view and a side view of a light guide plate of the present invention, the light guide plate 5 has a carrier 3, and the carrier 3 has a plurality of areas 22, and each area 22 comprises a plurality of light-guiding micro structures 23, after the light guide plate 5 is manufactured and the screen plate 6 is removed. The closer the distance of the light-guiding micro structures 23 from the light source, the lower is the density of distribution of the light-guiding micro structures 23. The farther the distance of the light-guiding micro structures 23 from the light source, the higher is the density of distribution of the light-guiding micro structures 23. The light-guiding micro structures 23 change the light path, such that the light-guiding micro structures 23 have a focusing effect for guiding the light to a keypad on the keypad structure.

Figure 15:
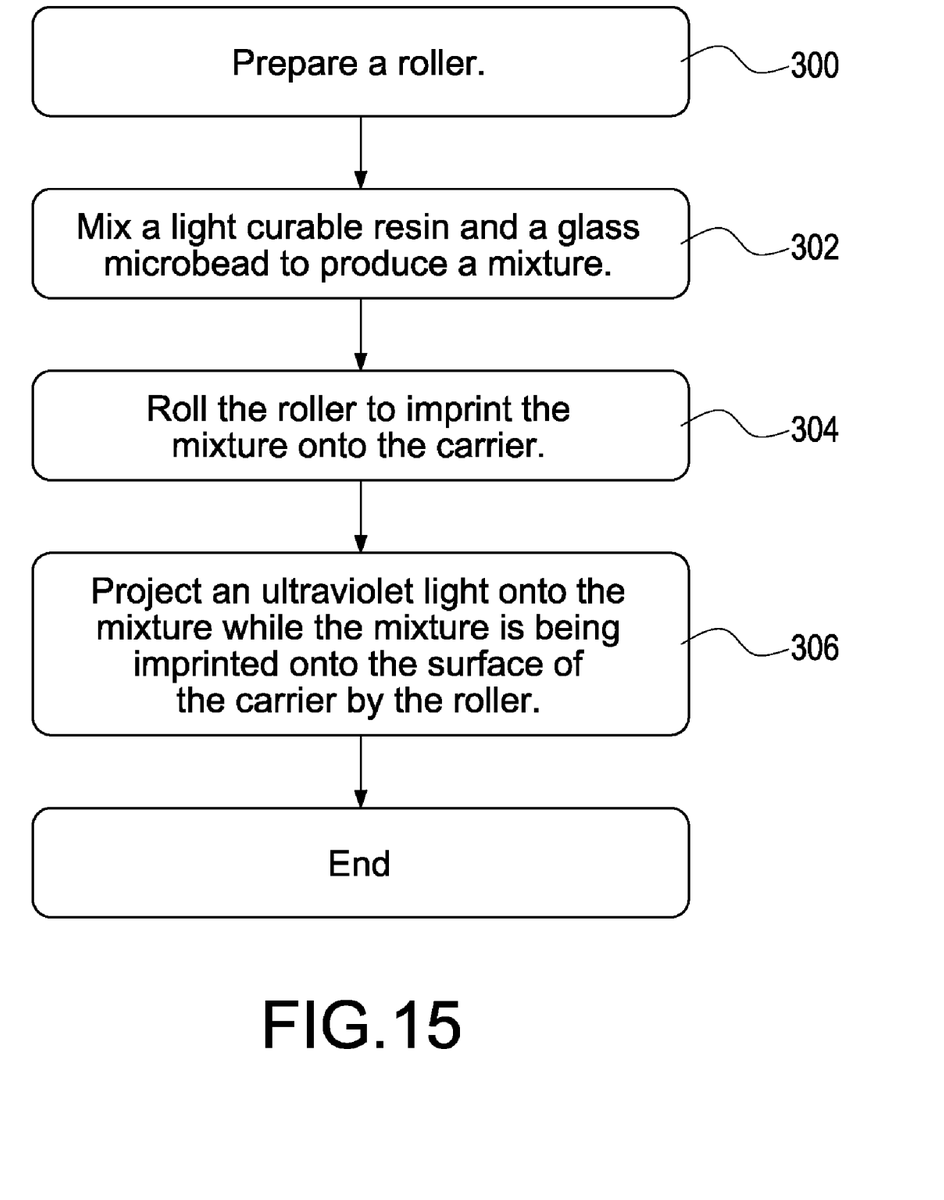
FIG. 15 is a flow chart of manufacturing another type of light guide plate in accordance with the present invention.

Referring to FIG. 15 for a flow chart of manufacturing another type of light guide plate in accordance with the present invention, a method of manufacturing a light guide plate installed in a keypad structure comprising the following steps:

Step 300: Prepare a roller.

Step 302: Mix a light curable resin and a glass microbead to produce a mixture. In FIG. 15, the light curable resin is an ultraviolet curable resin.

Step 304: Pour the mixture into a funnel, such that the mixture drops from the funnel to the roller. When the roller is rolling, the mixture is imprinted onto a surface of the carrier. In FIG. 15, the carrier is a transparent color film which can be either a PC film or a TPU film.

Step 306: Projecting an ultraviolet light onto the mixture while the mixture is being imprinted onto the surface of the carrier by the roller, such that the mixture is cured at the carrier to complete manufacturing a light guide plate.

Figure 16:
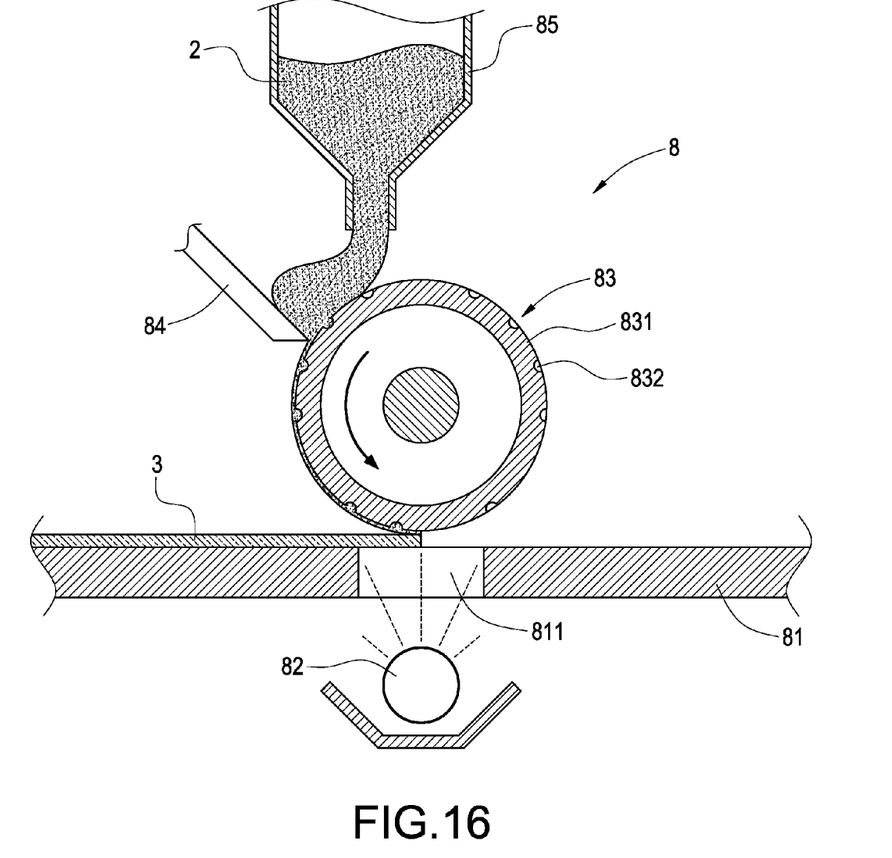
FIG. 16 is a schematic view of a machine used for manufacturing a light guide plate in accordance with the present invention.
Figure 17:
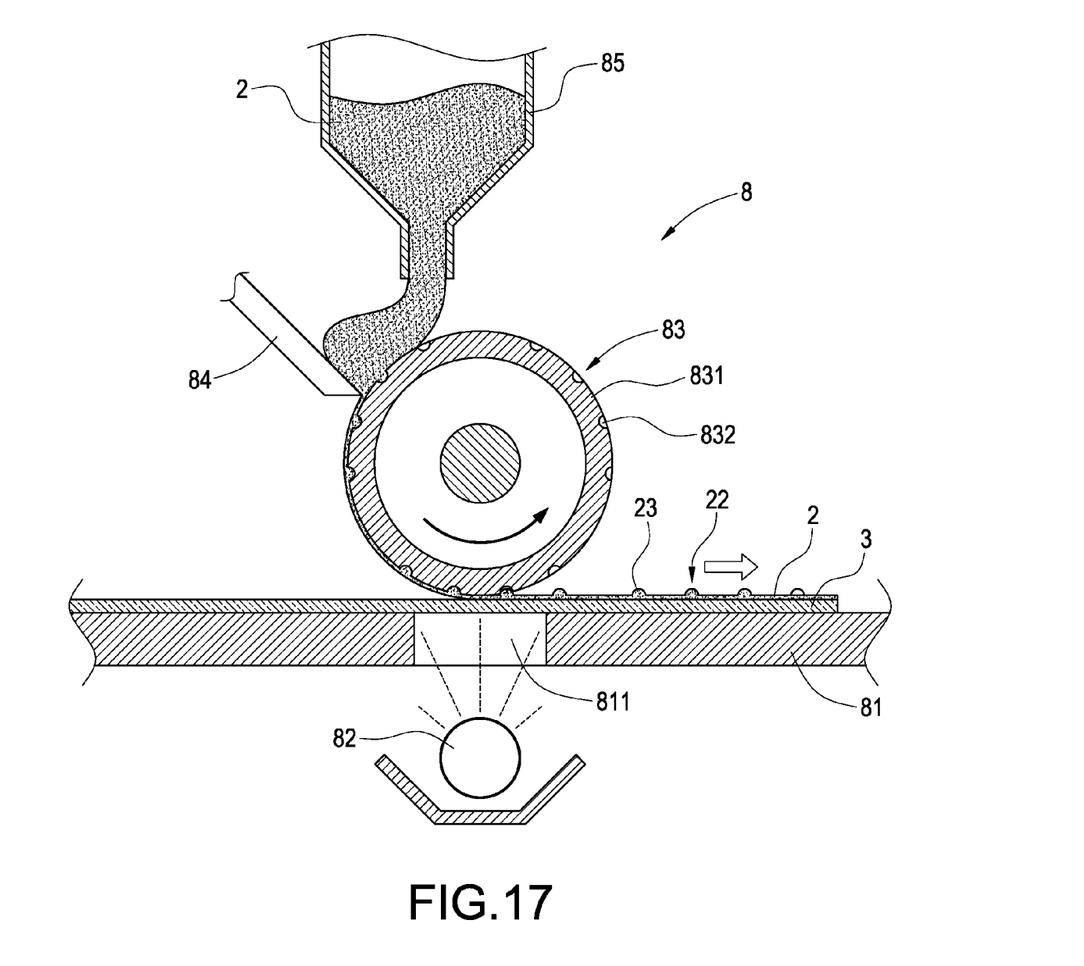
FIG. 17 is a schematic view of the operations of manufacturing a light guide plate in accordance with the present invention.

Referring to FIGS. 16 and 17 for schematic views of a machine and operations of manufacturing a light guide plate in accordance with the present invention, the manufacture of a light guide plate machine 8 comprises:

a conveyor platform 81, for conveying a carrier 3 having a through hole 811;

a spot light 82, being an ultraviolet lamp light, and installed inside the conveyor platform 81 and corresponding to the through hole 811;

a roller 83, installed above the conveyor platform 81 and corresponding to the through hole 811, and having a plurality of areas 831 on a surface of the roller 83, and each area 831 comprising a plurality of concave holes 832;

a scraper 84, installed on a lateral side of the roller 83; and a funnel 85, installed above the roller 83, for filling a mixture 2.

If the mixture 2 is filled into the funnel 85, and the carrier 3 is sent to the conveyor platform 81, and the mixture 2 is dropped onto the surface of the roller 83 while the roller 83 is rolling, and the scraper 84 perform a scrape, the mixture 2 will be filled into the plurality of small concave holes 832 and on the surface of the roller 83, and then imprinted onto the surface of the carrier 3.

When the roller 83 imprints the mixture 2 onto the surface of the carrier 3, the ultraviolet light of a spot light 83 is emitted from the through hole 811 and projected onto the mixture 2.

After the mixture 2 leaves the roller 83, the mixture 2 is cured onto the carrier 3 to complete manufacturing the light guide plate.

The light guide plates shown in FIGS. 6 and 7 are the same. The light guide plate 5 has a carrier 3, and the carrier 3 has a laminate 21, and the laminate 21 has a plurality of blocks 22, and each block 22 comprises a plurality of light-guiding micro structures 23. The closer is the distance of light-guiding micro structures 23 from the light source, the lower is the density of distribution of the light-guiding micro structures. The farther is the distance from the light source, the higher is the density of distribution of the light-guiding micro structure 23. The light-guiding micro structures 23 change the light path, so that it has a focusing effect to guide the light towards a keypad on the keypad structure.

The present invention is illustrated with reference to the preferred embodiment and is not intended to limit the patent scope of the present invention. Various substitutions and modifications have suggested in the foregoing description, and other will occur to those of ordinary skill in the art. Therefore, all such substitutions and modifications are intended to be embraced within the scope of the invention as defined in the appended claims.

What is claimed is:

1. A method of manufacturing a light guide plate of a keypad, comprising:
   (a) preparing a screen plate having a plurality of areas, each area comprising a plurality of meshes;
   (b) preparing a carrier;
   (c) mixing a baking type ink and a glass microbead to produce a mixture;
   (d) attaching a first side of the screen plate to a surface of the carrier;
   (e) pouring the mixture on a second side of the screen plate opposite the first side of the screen plate;
   (f) using a smoothing tool to level the surface of the carrier, such that the mixture can be permeated into a mesh and attached onto the surface of the carrier; and
   (g) performing a baking process to cure the mixture onto the carrier, so as to complete manufacturing the light guide plate, wherein the light guide plate being is able to converge light and able to change a light distribution density from its density at a light source.

2. The method of manufacturing a light guide plate of a keypad as recited in claim 1, wherein the screen plate in Step (a) is a cuboid.

3. The method of manufacturing a light guide plate of a keypad as recited in claim 1, wherein the carrier in Step (b) is a transparent color film selected from a PC film or a TPU film.

4. The method of manufacturing a light guide plate of a keypad as recited in claim 1, wherein the baking type ink in Step (c) is composed of polycyclic aromatic hydrocarbon (PAH), cyclohexanone, butoxide and polymer resin, all having a high boiling point.

5. The method of manufacturing a light guide plate of a keypad as recited in claim 1, wherein the smoothing tool in Step (f) is a scraper.

* * * * *